United States Patent
Zhang et al.

(10) Patent No.: US 6,777,655 B2
(45) Date of Patent: Aug. 17, 2004

(54) UNIFORM MICROWAVE HEATING OF FOOD IN A CONTAINER

(75) Inventors: Hua Zhang, New Milford, CT (US); Laurence Hayert-Bonneveau, Auffay (FR); William Yout, Envermeu (FR); Gary C. Helstern, Newtown, CT (US); Gérard Loizeau, New Milford, CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/118,033

(22) Filed: Apr. 9, 2002

(65) Prior Publication Data

US 2003/0189042 A1 Oct. 9, 2003

(51) Int. Cl.[7] .................................................. H05B 6/80
(52) U.S. Cl. ....................... 219/725; 219/728; 426/243
(58) Field of Search ................................ 219/725, 728, 219/729, 732, 736, 745, 730, 734, 735; 220/790, 4.21, 4.22, 784, 759; 426/107, 111, 243; 99/DIG. 14

(56) References Cited

U.S. PATENT DOCUMENTS

| | | | |
|---|---|---|---|
| 4,351,997 A | 9/1982 | Mattisson et al. | 219/729 |
| 4,416,907 A | * 11/1983 | Watkins | 426/234 |
| 4,626,641 A | 12/1986 | Brown | 219/729 |
| 4,661,672 A | 4/1987 | Nakanaga | 219/729 |
| 4,831,224 A | 5/1989 | Keefer | 219/728 |
| 4,851,631 A | 7/1989 | Wendt | 219/729 |
| 4,866,234 A | 9/1989 | Keefer | 219/728 |
| 4,934,829 A | * 6/1990 | Wendt | 374/45 |
| 4,992,638 A | 2/1991 | Hewitt et al. | 219/728 |
| 5,200,590 A | * 4/1993 | Bowen et al. | 219/727 |
| 5,370,883 A | * 12/1994 | Saunier | 426/107 |
| 5,519,195 A | * 5/1996 | Keefer et al. | 219/728 |
| 5,864,123 A | 1/1999 | Keefer | 219/728 |
| 5,986,248 A | 11/1999 | Matsuno et al. | 219/728 |

FOREIGN PATENT DOCUMENTS

| | | |
|---|---|---|
| EP | 0 206 811 | 12/1986 |
| EP | 0 246 041 B1 | 11/1987 |
| EP | 0 486 221 A1 | 5/1992 |
| EP | 0 511 507 A1 | 11/1992 |
| JP | 09-369450 | 7/1999 |
| WO | WO 92/19511 | 11/1992 |

* cited by examiner

*Primary Examiner*—Quang T. Van
(74) *Attorney, Agent, or Firm*—Winston & Strawn LLP

(57) ABSTRACT

The invention relates to a device and method for ensuring more uniform heating of food by microwaves. The method includes providing food in a portion having a predetermined size and shape; and providing a container adapted for receiving and reheating the portion of food in a microwave oven. The container forms a supporting cavity having peripheral sides and a bottom side, with the portion of food placed within the supporting cavity. The peripheral sides of the container are circumferentially shielded by a microwave reflective material that forms a circumference having axial and transverse distances that are determined so as to change the wavelength of resonant modes inside the food thereby resulting in a more uniform heating food pattern.

20 Claims, 9 Drawing Sheets

IR00135.ISI

IR00133.ISI

IR00134.ISI

IR00140.ISI

UNIFORM MICROWAVE HEATING OF FOOD IN A CONTAINER

FIELD OF THE INVENTION

The present invention relates to a device and method for improving heating of food in a microwave oven. The invention addresses the problems of cold spot, uneven heating and splattering that traditionally occur when foods are heated in a microwave oven. In particular, the present invention proposes a method for handling and evenly heating frozen food that can be economically, conveniently and rapidly served in a foodservice location to the consumer. The invention also relates to a stand-like device adapted to receive a food container for improving the reheating of the food in a microwave oven.

BACKGROUND OF THE INVENTION

Microwave reheating of frozen meals provides convenience for people seeking quick meal solutions because of the rapid thermal energy transfer into the food materials by the microwaves. However, microwave heating of frozen food is, in general, perceived as difficult and has many problems associated with it, such as overcooking of some portions of meals, cold spots, burnt edges and sauce splatter. In many instances, the meal experiences serious burnt spots yet some places are still very cold, even often below 0° C. Furthermore, the concentration of the microwave energy on spots tends to create local boiling of the water contained in the food and/or sauce and therefore splattering off the dish.

Many attempts have been made in the past to solve this issue of re-heating frozen food in a more effective way.

It has previously been proposed in U.S. Pat. No. 4,351,997 to provide a modified form of tray structure to attempt to provide a more even heating of foodstuff in the tray when exposed to microwave radiation. This prior art has a bottom wall of microwave-transparent material and an upwardly-extending peripheral wall that is outwardly curved at its upper end to define a horizontal peripheral rim. The rim is partly or completely coated with a material that is reflective and opaque to microwave radiation, such as aluminum foil. The peripheral wall also is partly or completely coated with the foil material. The effect of this aluminum foil coating on the wall is to provide reflection of microwave energy toward the center of the tray.

U.S. Pat. No. 4,626,641 describes an embodiment in which a similar structure is provided. In addition to the provision of aluminum foil in the side wall of a tray, the foil also extends into the base of the container but leaves a rectangular open area in the bottom wall.

WO 92/19511 relates to a tray useful for the microwave cooking of prepared foodstuff that comprises an outer layer formed of paperboard or molded plastic to which is laminated an inner polymeric film layer. A layer of microwave-reflective material, usually aluminum foil, is positioned between the outer and inner layers in the location of the peripheral wall of the tray and in a pattern in a portion of the bottom wall.

JP 09-369450 relates to a container for a microwave oven that comprises a first microwave reflecting plate placed along a circumferential lateral parts and a second microwave reflecting plates in the base section of the container.

It is apparent from the prior art that attempts have essentially been made to provide energy transmission structures with reflective material placed in locations that enable energy transfer from the edges and corners of the plate to a more central area of the plate. However, experimental trials have shown that these structures are, by themselves, insufficient to overcome the problems of uneven heating. In particular, cold areas are still present in the food despite the presence of these structures. Thus, improvements in these devices are needed and are provided by the present invention.

SUMMARY OF THE INVENTION

The present invention aims at providing a satisfactory solution for evenly heating a frozen food in a plate by adopting a different approach where not only energy transfer is carried out but more importantly a modification of the overall heating pattern inside the food block is achieved by changing the wavelength inside the food. Thus, the present invention aims at providing a convenient and easy way for improving microwave reheating of food while enabling the use of standard dishes such as ceramic and ceramic-like plates that may commonly be found in restaurants, cafeterias, hotels, or other foodservice locations.

The present invention specifically relates to a method for ensuring a more uniform heating of frozen food by microwaves. This method is conducted by providing food in a portion having a predetermined size and shape; and providing a container adapted for receiving and reheating with microwaves the food portion. The container includes a supporting cavity having peripheral sides and a bottom side, with the peripheral sides of the container being circumferentially shielded by a microwave reflective material such that the microwave reflective material on the peripheral sides forms a circumference which has axial and transverse distances that are determined so as to change the wavelength of resonant modes in the supporting cavity. The method includes placing the portion of food in the supporting cavity; and heating the food and container with microwaves so as to expose the food to the changed wavelengths of resonant modes in the cavity thereby resulting in a more uniform heating food pattern and a more uniform heating of the food.

It has been surprisingly found that it is possible to render the heating of the food in the container relatively even by shortening the wavelength of the resonant modes inside the cavity of the food, especially for the transverse electric (TE) modes. Shortening of the wavelength and supporting of specific resonant modes can be obtained more specifically by determining the distances that separate the microwave reflective material when placed cicumferentially along the side of the container in a manner to promote modes that show a more even electric field distribution.

In a preferred embodiment, the microwave reflective material forms a resonating layer having a transverse dimension of 15 cm or less. Preferably, the transverse dimension of the resonating layer is of less than 13 cm, even preferably of from about 10 to 12 cm. Preferably, the axial dimension of the resonating layer is of 20 cm or less, even preferably of less than 18 cm.

Therefore, the resonating layer can be regarded as a resonator or waveguide where shortened standing waves occur inside the food. As the transverse dimension of the resonating layer is shortened, transverse electric ("TE") modes that carry more power than transverse magnetic ("TM") modes are propagated in the cavity of the food. In particular, the TE modes that are permitted for the selected geometry are those with a more concentrated heating in the center area of the cavity. More preferably, TE modes that are predominantly supported in the food cavity are $TE_{n,m,1}$ modes wherein n may be 0, 1 or 2, m may be 0 or 1, and 1 may be 0 or 1.

Preferably, the microwave reflective material forms a resonating layer having a closed rounded contour. Even more preferably, the resonating layer has an oval contour with an axial dimension of less than 20 mm, preferably less than 18 mm. In an alternative embodiment, the resonating layer has a circular contour. In a preferred embodiment, the bottom side is substantially free of shielding material.

Remarkable results have been obtained by using such shapes and dimensions of a resonating layer. Comparative trials have shown that these are the preferred configurations for evenly heating food in the container.

The invention also relates to a method of using a container having the resonating layer as previously defined wherein, prior to placing the food portion in the container, the food portion is removed frozen from a package of defined shape and size which are predetermined to substantially match the shape and size of the cavity of the container. Therefore, the frozen food can be produced and packaged in the manufacturing facility according to specific standards of size and shape that are predetermined to provide optimal re-heating properties afterwards. Therefore, the food product may be packaged in a package that is not the final heating tray with its resonating layer so as to reduce the packaging costs. Therefore, contrary to the package which may usually be disposable, the final heating tray may be a dish made of a non-disposable material for repeated uses in a foodservice location such as a restaurant, a fast-food or a cafeteria.

The invention also relates to a stand-like device for improving the heating of food in a container. This device includes a support body of a shape and size adapted for receiving the container in a removable manner and a circumferential shielding surface of microwave reflective material adapted to be positioned adjacent to peripheral sides of the container.

In a preferred embodiment, the microwave reflective material of the circumferential shielding surface is defined by axial and transverse distances that are determined so as to change the wavelength of resonant modes inside the food thereby resulting in a more uniform heating food pattern. Still in a preferred embodiment, the support body has a wedge-shaped receiving surface to snuggly engage the complementary surface of the container and leverage means pivotally associated to the body to act on the bottom surface of the container to disengage the container from the wedge-shaped receiving surface.

The benefit of such a supporting stand is that it allows to more evenly heat the food in a microwave oven while reusable standard dishes such as traditional dishes can be used. Therefore, reusable standard dishes can become more effective for microwave reheating of food as compared to the use of the same dishes without the supporting stand. The supporting stand may be of a convenient use in kitchens of restaurants, hotel chains, transportation or other foodservice areas where paper or plastic dishes can not decently be used but only food in traditional ceramic or ceramic-like dishes can be served to the customer.

DETAILED DESCRIPTION OF THE PREFERRED EMBODIMENTS

Figure 1:
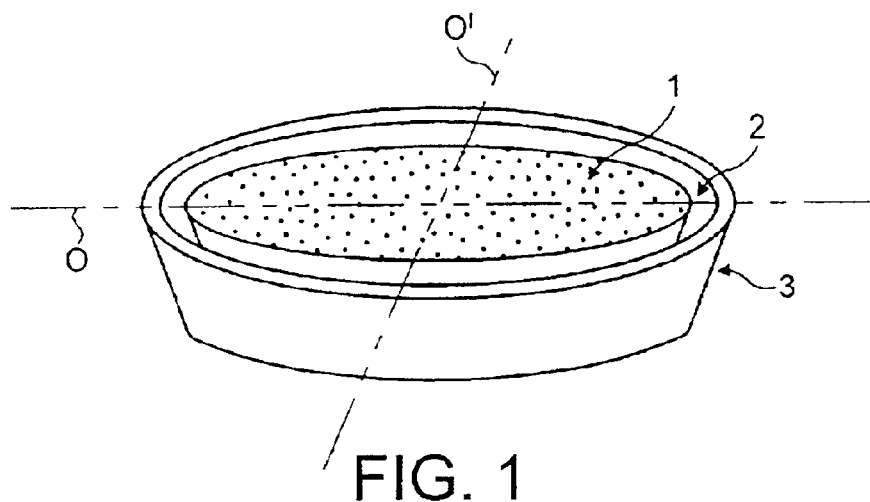
FIG. 1 is a perspective view of a plate adapted to form a resonator of shortened wavelength with a frozen food product ready for microwave heating.
Figure 2:
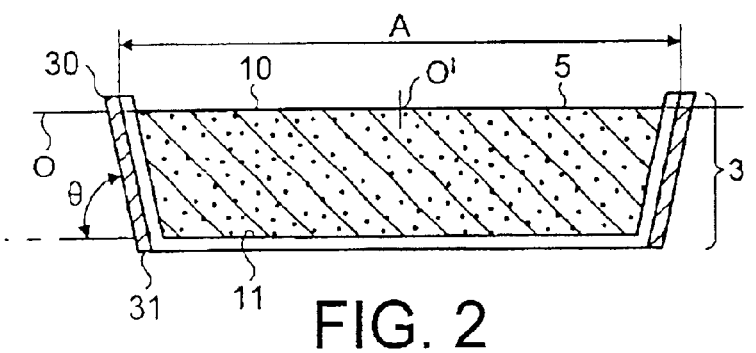
FIG. 2 is a cross section along line O of FIG. 1.
Figure 3:
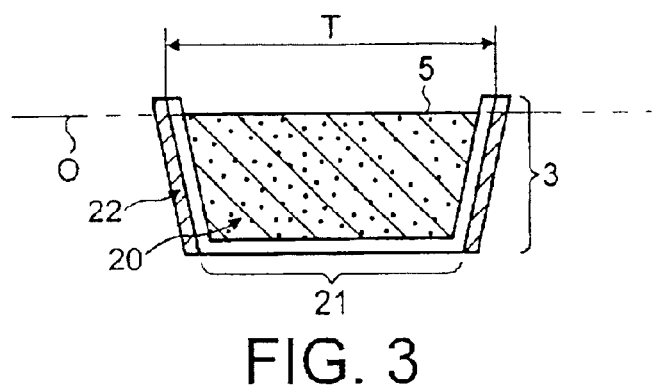
FIG. 3 is a cross section along line O' of FIG. 1.

With reference to FIGS. 1 to 3, the method of the invention aims at providing a solution for re-heating a frozen food product of predetermined size and shape in a plate that is specifically adapted for modifying the wave pattern during a microwave heating process in a manner that enables the transverse electric (TE) modes of higher power and more evenly distributed pattern to propagate inside the food product. The present invention aims at providing a method for quickly and evenly reheating food, in particular frozen food, with microwaves, in particular those provided by a conventional microwave oven that is 2450 MHz.

The method comprises providing a food portion 1 that is frozen, placing the food portion in the supporting cavity 20 of a tray or plate 2 of specific shape and size and heating the food portion in a microwave oven. The food may be any kind of food meal such as lasagna, pasta, rice, fish, meat, and vegetables with or without sauce and combinations thereof. The plate 2 includes a bottom portion 21 and upwardly oriented side portions 22 that together define a support member with the cavity for receiving the food portion 1. The plate should be formed, at least partly, from a material that is substantially transparent to microwave so as to avoid microwave energy loss in the material but be sufficiently rigid to support the weight of the food without significant deformation and to maintain the side portions extending upwardly. Therefore, the material for the plate can be chosen among the list consisting of ceramic, porcelain, glass, cardboard, polymer and combinations thereof.

Importantly, a circumferential surface 3 made of a material that is reflective to the microwave is provided that is placed adjacent the sidewall 22 of the plate. The circumferential surface may preferably be a band or layer of microwave reflective material that is placed adjacent the sidewall 22. The surface could also be part of the side portion itself or replace the whole sidewall 22.

According to the principle of the invention, the circumferential surface of reflective material has to respect dimensions and shapes that impart a modification of the wavelength in the dielectric food itself. As a result, in the event the plate and reflective surfaces are distinct parts, the shape and size of the plate should preferably be such that the plate can insert itself inside the available volume determined by the circumferential surface of the band. Preferably, the plate 2 should have a shape and size that complementary match the shape and size of the band 3, even though this is not mandatory, provided the plate 2 can fit between the band 3. For instance, the plate could be smaller or of a different shape as the band 3 itself.

As illustrated in FIGS. 1 to 3, the band has preferably a shape primarily extending in an elongated manner along an axial line O. In such a configuration, it is possible to define an axial distance A that corresponds to a longer distance between the internal surfaces of the band along axial line O.

Similarly, the band 3 forms a second dimension T that is taken transversally along a transverse axis O' that is substantially oriented orthogonally to axis O and passes that through the centerline of axial distance A. The transverse distance T represents the distance at this centerline between the internal surfaces of the reflective band as measured at a level of the upper surface of the food.

The distances A and T are preferably measured at the circumference of the band 3 at a level of the upper surface 5 of the food when the food is properly placed in the cavity for re-heating. However, in certain circumstances where the container is shallow and/or has sidewalls that form a low inclination relative to the bottom surface; e.g., the edges of a dinner plate, the food may usually project upwardly beyond the height of the sidewalls. In that event, the circumference for considering distances A and T will be regarded at the upper edge of the resonating layer.

According to one essential aspect of the invention, the distances A and T of the band are determined to provide a shortening of the wavelength when the food plate, as surrounded by the band 3, is heated in the microwave oven. Therefore, reflection or transfer of the microwave beam is not the primary effect that is sought. The primary effect that is sought is related to the modification of the propagation of the waves in the dielectric food material between two or more conductors that support a certain number of electromagnetic waves. These waves have a uniquely defined voltage, current and impedance. Waveguides, often consisting of a single conductor, support transverse electric (TE) and/or transverse magnetic (TM) waves, characterized by the presence of longitudinal magnetic or electric, respectively, field components. Therefore, the principle of the invention is to look at determining the boundaries of the band that acts as a waveguide so that high power TE modes of even density are primarily induced. More particularly, $TE_{nm}$ modes of evenly distributed density such as $TE_{01}$, $TE_{11}$, $TE_{21}$ are primarily supported while $TE_{nm}$ or $TM_{nm}$ modes of less evenly distributed density such as $TE_{31}$, $TE_{41}$, $TE_{51}$ or $TM_{31}$ are preferably discarded.

In order to promote domination of the desired TE modes, it has been found that the transverse distance T of the resonating band should be of 15 cm or less, preferably lower than 13 cm, even preferably ranging of from 6 to 12 cm. Similarly, the axial distance A of the band should be of 20 cm or less, preferably lower than 18 cm, even preferably ranging of from 6 to 15 cm. Remarkable and surprising results on the final temperature distribution have been obtained if those distance are properly respected. This effectively changes the wavelength of the resonant modes inside the dielectric cavity of the plate (inside the food), especially for those TE modes. This shortening of the wavelength makes the heating happens in the center of the food, therefore promoting a more uniform heating pattern.

The band may comprise tapered surfaces as shown in FIGS. 2 and 3 that form an angle θ with respect to the bottom of the plate comprised between 10 to 120 degrees, preferably, 15 to 90 degrees, and even more preferably 20 to 85 degrees. In fact, slightly tapering down surfaces promote a better heating. However, a problem in energy transmission in the bottom of the food may occur if the bottom surface of the plate is reduced, e.g., becomes less than 5 cm. Therefore, regardless of the inclination of the sidewall, the flat bottom of the plate should be maintained at a transverse dimension of at least 5 cm, and preferably at least 7 cm.

It has also been found that the microwave reflective material band should preferably be a continuous peripheral band of a height of at least 10 mm, preferably of from 10 to 60 mm, even preferably of from 25 to 45 mm. The food should preferably be placed so that its upper surface 10 is placed below the upper line 30 of the band 3, preferably at 0 to 15 mm below, even preferably at 2 to 10 mm below. Similarly, the food lower surface 11 contacting the bottom of the plate should be at a level above the lower line 31 of the band of from 0 to 10 mm, preferably 0.5 to 5 mm, preferably 2 to 3 mm.

Although an oval contour is preferred for the band, since the best results have been found with such a configuration, it remains possible to have a band of circular contour. In that event, the transverse distance T and the axial distance A form a diameter that should be preferentially determined, as for the previous example, to be a distance equal to or less than 15 cm, preferably less than 13 cm, even preferably of from 6 to 12 cm.

The band or layer 3 may preferably comprise a metallic material that is placed adjacent the sidewall 22 of the plate. The band may be either attached or simply positioned in close contact with the outer surface of the sidewall 22. In another embodiment, the band may be positioned adjacent to the inner surface of the sidewall 22 of the plate.

In a preferred embodiment, the band 3 may be a rigid metal foil that forms a ring or stand forming a large central aperture of a shape and size adapted for the plate to nest therein.

In an alternative, the band may be a coating material, for instance, a metal coating on the surface. In order to provide a sufficient microwave resonating effect, the coating has a thickness that preferably is at least 3.2 microns, and even more preferably of at least 10 microns. The coating may be carried out by any suitable means such as by vacuum metallizing or chemical etching. Those coating techniques are well known by the man skilled in the art of surface treatment and, therefore, do not need to be described further herein.

In an alternative, the band may be a metallic tape that is adhered by an adhesive to the surface of the sidewalls of the plate.

The inside volume and shape demarcated by the circumferential band may be determined to match the external volume and shape of the plate and, therefore, can take any possible cross sectional configuration such as parallel, trunconical or a stepped configuration.

Figure 4:
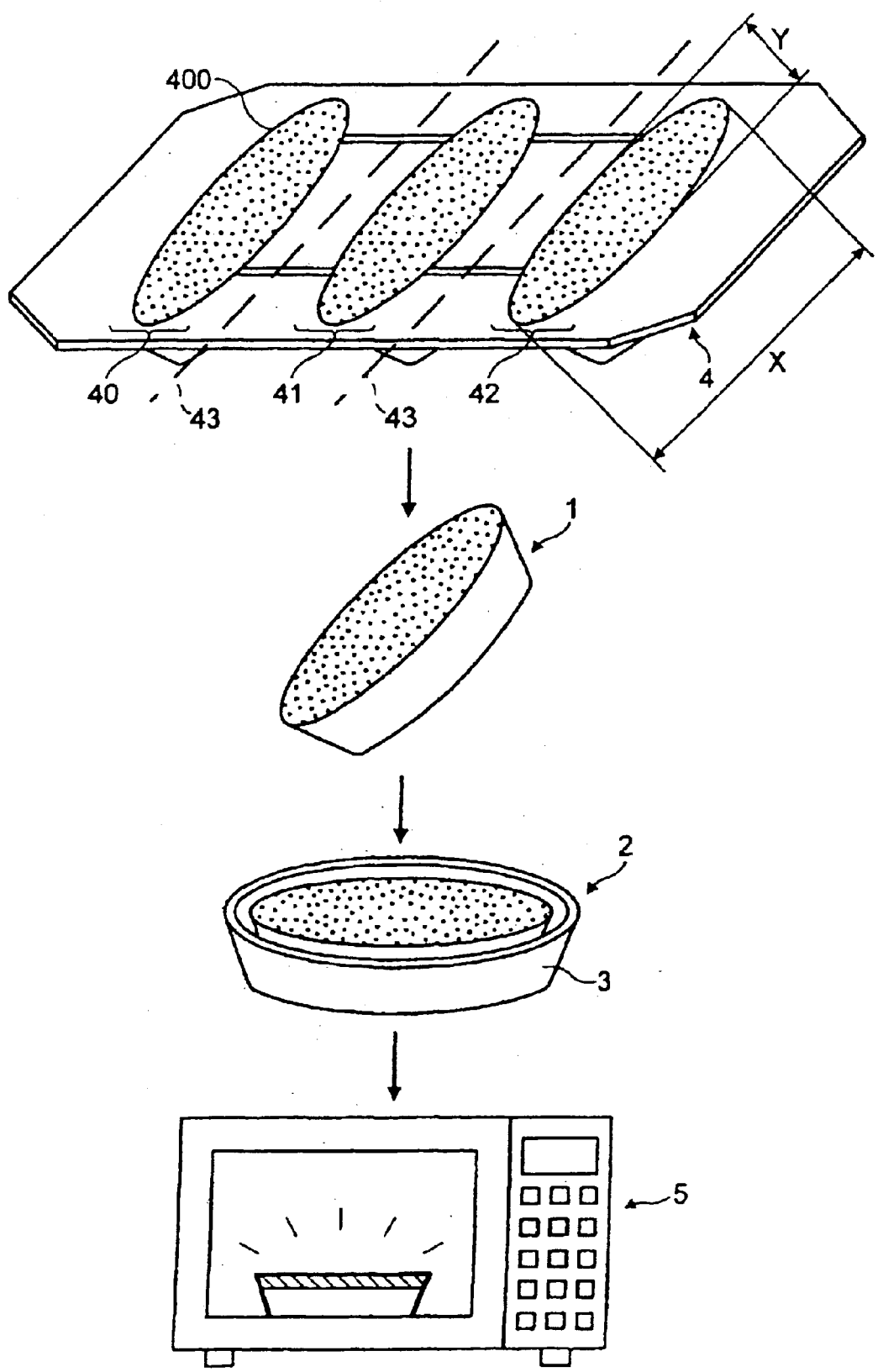
FIG. 4 is a schematic illustration of the preferred method for re-heating a frozen food.

FIG. 4 shows a preferred method for preparing a warmed food in a plate from a frozen food product using the teaching of the present invention. The method preferably includes the preliminary step of portioning the food to form food portions of given size and shape and individually packaging the food portions in a package for convenient and hygienic transport and storage. The portioning and packaging are preferably carried out in a food manufacturing facility utilizing all hygienic and quality standards required in the food manufacturing art. The food portions are preferably packaged in a pre-formed package 4 that predetermines the final shape and size of each individual food portion that are subsequently re-heated. Preferably, the pre-formed package 4 comprises at least one and preferably a plurality of packaging cells 40, 41, 42. The cells forms a plurality of individual cavities wherein each of them have a shape and a size adapted to precisely fit in the cavity of the plate 2 for the microwave re-heating while considering the positioning constraints that have been determined earlier in the present description for obtaining the intended result on uniformity of heating. If the plate and the band has an oval contour, the cavity of the cell should also preferably have an oval contour 400 of predetermined length X and width Y. The dimensions X and Y are measured at the outer surface of the food. The dimensions X and Y are determined to substantially correspond to the internal dimensions of the heating plate 2 it fits in so that no large gaps are left in the cavity between the product and the plate. It has been noticed that large gaps provide the edge of the food a higher than desired heating. Therefore, gaps, if any, between the product and the inner surface of the tray or dish should be of less than about 8 mm, preferably of less than 5 mm. Even more preferably, there should be no gap at all between the side surface of the dish and the side surface of the food. For example, the contour of the food may have dimensions of X of between about 15 to 19 cm and for Y between about 8 to 15 cm.

The pre-formed package 4 may be made of a thermoformed plastic foil or any equivalent formable material that can retain a given shape after forming. The foil is thermoformed to form the cavities and edges that surround the cavity. The material should advantageously be sufficiently deformable to allow easy removal of the food block from the cell. The preformed package can be a foodgrade polypropylene or any other suitable plastic of from about 0.1 to 1 mm in thickness. A plurality of cells 40–42 can be formed in a single sheet of plastic as illustrated for cost manufacturing reasons and can be separated along cutting lines 43, if necessary, or can be kept grouped as a collective package 4, if there is a need for distributing or selling more than one food package at a time.

The cells are filled in by food to form the food portions. Depending on the food recipes, freezing may be required before filling in the cells. Freezing may be carried out on discrete food components, for instance, pasta layers, vegetable pieces, meat balls, etc., or on the food block itself whereas other components such as sauce, cheese and the like, may be placed, poured or deposited in the cells at ambient or just at chilled temperature.

As a matter of safety, freezing of the filled cells should always be subsequently completed until the whole food portion has reached the frozen temperature range required. The food containing cells are usually rapidly cooled to the required freezing temperatures, i.e., minus 18 to 40° C. Freezing may usually be carried out in a spiral freezer or in a freezing tunnel under liquid nitrogen jets or any other suitable freezing technology. Then, the cells may be closed by thin plastic wrap that is sealed onto the edges of the cells or, alternatively, the preformed package 4 may be simply stacked and packed in a cardboard box with a partition film to separate them in the box.

In another embodiment (not shown), the cells may also be made of a flexible non-preformed material such as in thin plastic wrap with the shape and size of the cell's cavity to shape the food portion being defined by an external mould. In that event, the plastic wrap is covered onto the mould surface, the food components are deposited into the plastic wrap and the final block is frozen and removed from the mould.

The advantage of the packaging cells resides in that packaged food blocks can be mass produced in an inexpensive manner that are properly sized to fit a shielded container of specific size as aforementioned. The container may, for instance, be such as a reusable ceramic dish used in restaurant or other foodservice catering areas. The food can, therefore, be transferred from the cell to the ceramic dish to be reheated in a microwave oven and served directly to the consumer in its dish. After food consumption, the dish can thus be washed and re-used as a normal dish.

Figure 5:
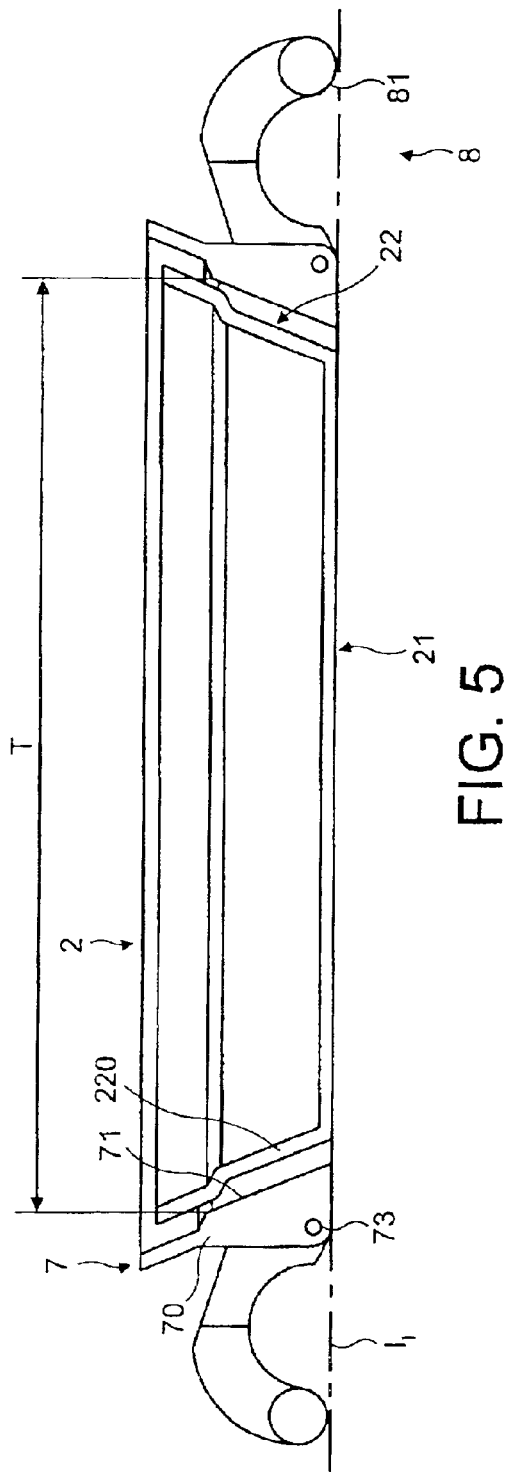
FIG. 5 is a preferred embodiment of a plate assembly comprising a supporting stand of microwave resonating material in a configuration ready for microwave heating.
Figure 6:
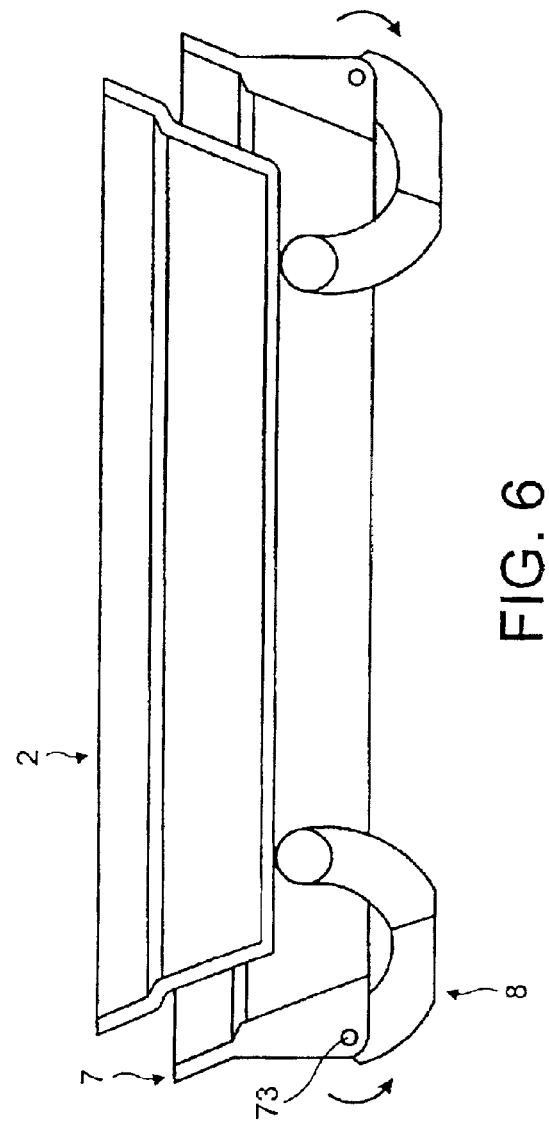
FIG. 6 is a view similar to FIG. 5 when the plate is removed from the stand after reheating.
Figure 7:
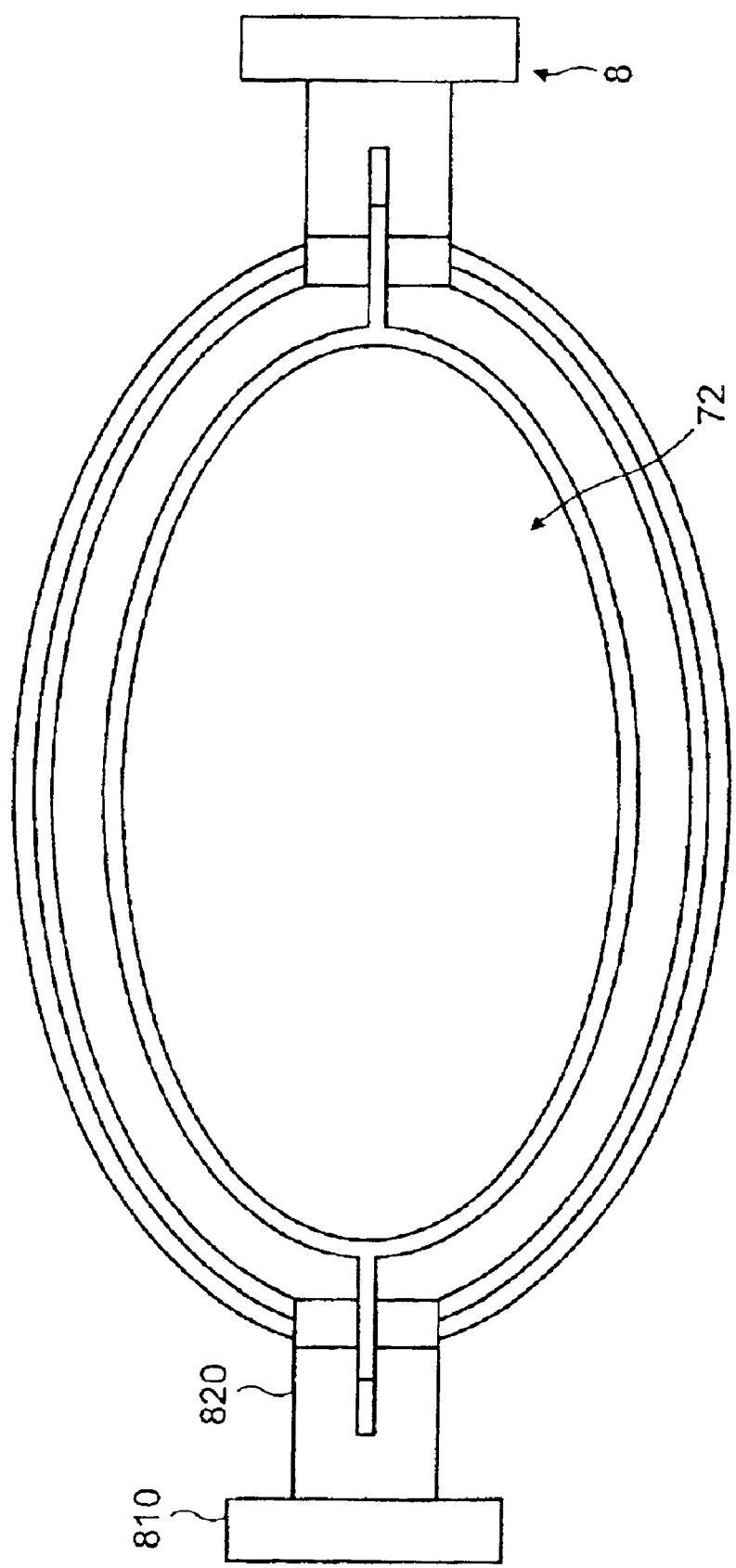
FIG. 7 is a bottom view of the supporting stand of FIG. 5 without the container inside.

FIGS. 5 to 7 illustrate an embodiment in which a supporting stand 7 comprising a reflective material is adapted to substantially nest the container 2 in a removable manner. The stand may be specifically adapted to receive reusable dish of specific size and shape. In particular, the stand 7 has a body 70 with a wedge-shaped receiving surface of microwave reflective material 71 arranged to snuggly engage the complementary shaped exterior surface 220 of the sidewalls 22 of the container. The microwave reflective surface 71 extends circumferentially to encompass the sidewalls of the container. The body may be formed entirely of reflective material such as metal or be only partly coated of microwave reflective material on its inner receiving surface 71 while the rest is made of a different material such as plastic, ceramic, etc. The body may therefore form a central truncated surface of a shape that substantially complements the external side portions 22 with a central bottom aperture 72 arranged to leave the bottom portion 21 of the container substantially uncovered by the shielding material. The stand 7 may further comprise leverage means 8 adapted for conveniently and safely disengaging the container from the metal body after the heating of the food container has been performed. For instance, the leverage means 8 may be formed of a pair of levers 80, 81 pivotally attached to the metal body, along rotational axis 73, to act on the bottom surface of the container to disengage the container from the stand by upward pushing on the bottom side 21 of the container. The levers may preferably have a hook type shape comprising a rounded support end 810 and a connecting portion 820. The rounded end 810 is large enough to form a well distributed fulcrum on the bottom of the container when the lever is activated in rotation so to be able to properly lift the container without blocking. The levers are thus positioned in a retracted position where the support end 810 is maintained inset relative to the bottom support plane $I_1$ formed by the stand/container assembly when on rest onto the oven's surface (FIG. 5). Then, after sufficient heating has been carried out, the heating assembly is taken out from the oven and the levers are manually actuated in pivot about their axis 73 to lift the container off the body of the stand (FIG. 6).

The stand should preferably respect the dimensions T and A, as previously defined, for promoting support of TE modes with more even electric field distribution. To provide an effective effect, the dimensions should be defined depending on the type of dish that is intended to be received, e.g., whether it is a deep or shallow dish, so that the dimensions T and A will be taken, approximately at the surface of the food or, alternatively, at the uppermost edge of the reflective material surface. For instance, in FIG. 5 is more particularly illustrated a "plat à sabot" type dish that is inserted in the stand-like device of the invention. This type of dish is sufficiently deep to accommodate a food portion that partially fills in the cavity of the dish until a certain stepped line which may be considered as the effective position for measuring dimensions T and A.

The stand may be particularly adapted for receiving a ceramic or ceramic-like dish into which is inserted the food portion coming from the packaging cells as described earlier. Therefore, one benefit of the supporting stand is that traditional dishes of appropriate dimensions and shape such as "plat à sabot", "china plates" or other dishes, can be successfully used for reheating meals in a microwave oven such as dense frozen meals, whereas if they would be used alone, i.e., without the help of the stand, problems of cold spot, uneven heating and splattering would be clearly noticed.

EXAMPLES

Example 1 Comparative

Heating of Lasagna in Oval Plate without Metallic Side Band

A frozen lasagna product of 387 grams is placed in an oval plate ("plat à sabot") having a long axis of 17.8 cm, a short axis of 10.4 cm, height of 3.1 cm, and no metallic shielding on the side wall. The food product is heated in Welbilt microwave oven (850 Watts) for 6 minutes. The temperature measurement showed a cold spot below 18° C. and edges boiled over.

Figure 8:
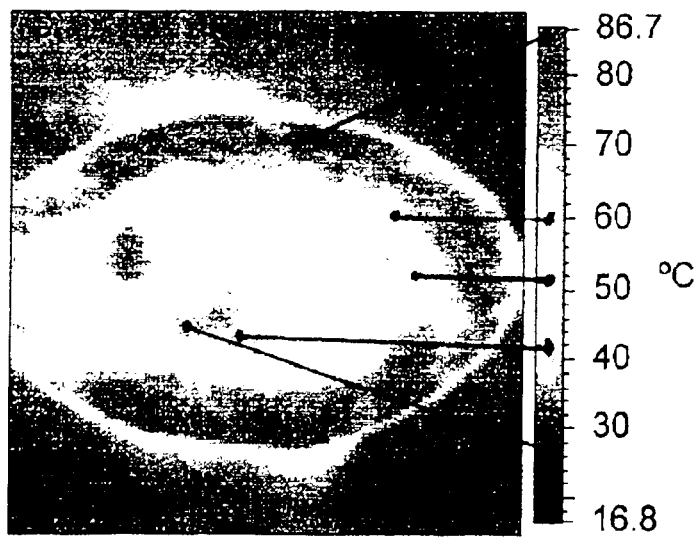
FIGS. 8 to 14 are comparative thermograph diagrams of the heat distribution of the food after it has been submitted to microwave radiation in different plates and trays.

FIG. 8 shows the corresponding thermograph at the end of the heating stage.

Example 2

Heating of Lasagna in Oval Plate with Half Upper Metallic Side Band

The same food product is heated in a plate of identical dimension with a metallic shielding tape adhesively attached to the upper half of the upward sides of the plate. The lower half of the sides is left uncovered. The product weighed 389 grams and was heated in the same oven as Example 1 for 6 minutes. The product showed a cold spot below 39° C. and edge slightly boiled over.

Figure 9:
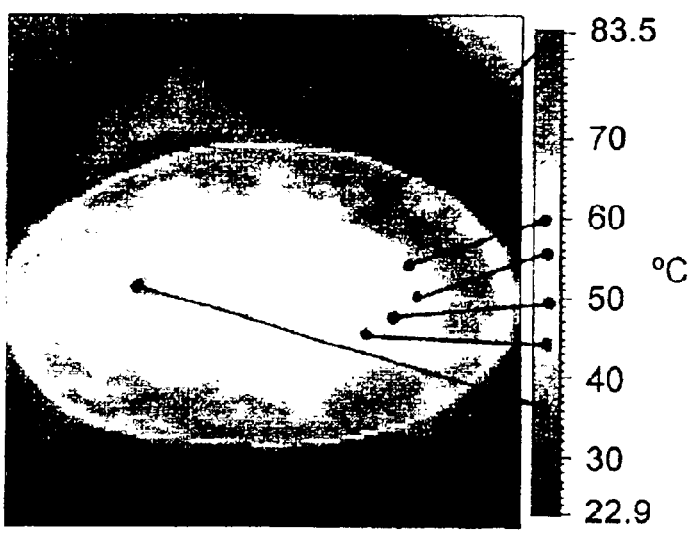

FIG. 9 shows the corresponding thermograph at the end of the heating stage.

Example 3

Heating of Lasagna in Oval Plate with a Full Metallic Side Band

The same food product is heated in a plate of identical dimension with a metallic shielding tape adhesively attached onto the full sides of the plate. The bottom of the plate is left uncovered. The product weighed 386 grams and was heated in same oven and for 6 minutes. It had no cold spot with a temperature of the surface higher than 65° C. and no burnt edge and corner.

Figure 10:
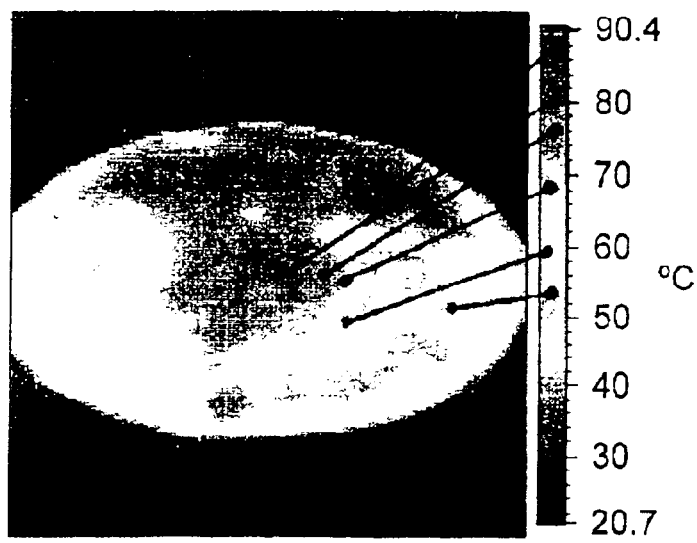

FIG. 10 shows the corresponding thermograph at the end of the heating stage.

Example 4

Heating of Lasagna in a Rectangular Tray with No Metallic Side Band

The same food product is heated in a rectangular tray of 12.7 cm long, 15 cm large and 2.5 cm high, with no metallic shielding. The product weighed 360 grams and was heated in same oven and for 6 minutes. It showed good temperature but edge heating was excessive.

Figure 11:
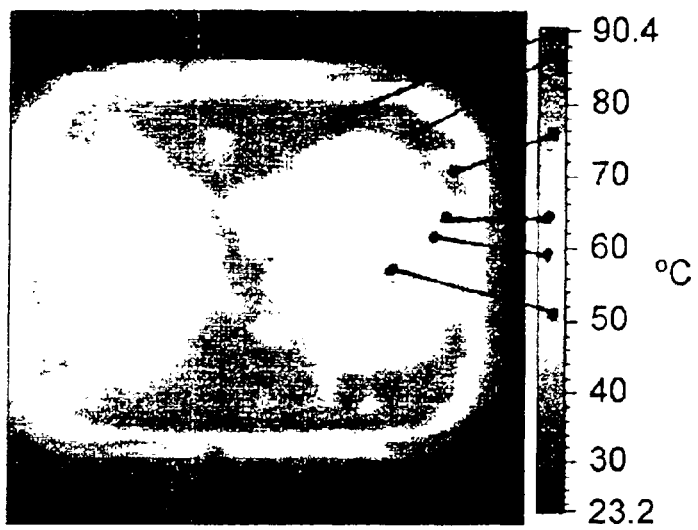

FIG. 11 shows the corresponding thermograph at the end of the heating stage.

Example 5

Heating of Lasagna in a Rectangular Tray with Full Metallic Side Band

The same food product is heated in a rectangular tray of 12.7 cm long, 15 cm large and 2.7 cm high, with a metallic shielding tape adhesively attached onto the full sides of the plate. The bottom of the plate is left uncovered. The product weighed 386 grams and was heated in same oven and for 6 minutes. It showed a cold spot (34° C.) but edge was not boiled.

Figure 12:
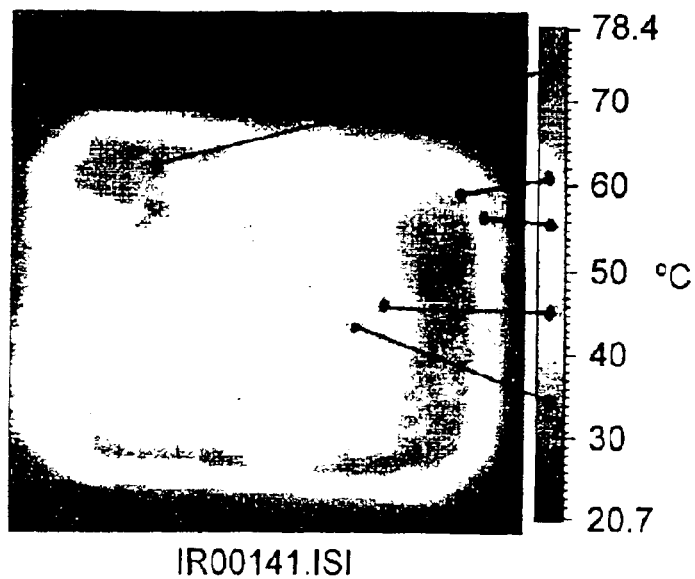

FIG. 12 shows the corresponding thermograph at the end of the heating stage.

Example 6

Heating of Lasagna in a Large Oval Plate with No Metallic Side Band

The same food product frozen lasagna product of 545 grams is placed in an oval plate ("plat à sabot") having a long (longitudinal) axis of 24 cm, a short (transverse) axis of 13.1 cm, height of 2.5 cm, and full metallic shielding on the side walls. The food product is heated in a LG1000W oven for 6.5 minutes. The center was still cold (2.5° C.) but the edge was boiled and dried.

Figure 13:
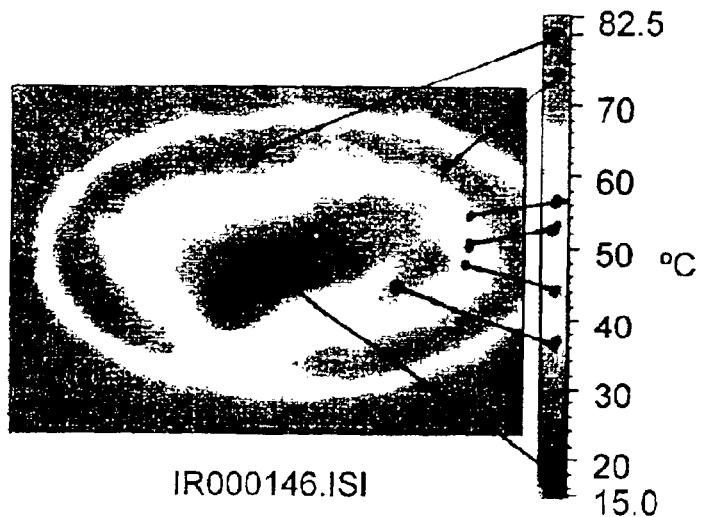

FIG. 13 shows the corresponding thermograph at the end of the heating stage.

Example 7

Heating of Lasagna in a Large Oval Plate with Full Metallic Side Band

The same food product frozen lasagna product of 545 grams is placed in an oval plate ("plat à sabot") having a long (longitudinal) axis of 24 cm, a short (transverse) axis of 13.1 cm, height of 2.3 cm, and full metallic shielding on the side walls. The food product is heated in a LG1000W oven for 6.5 minutes. The center was still cold (3.5° C.) but the edge was not boiled and dried.

Figure 14:
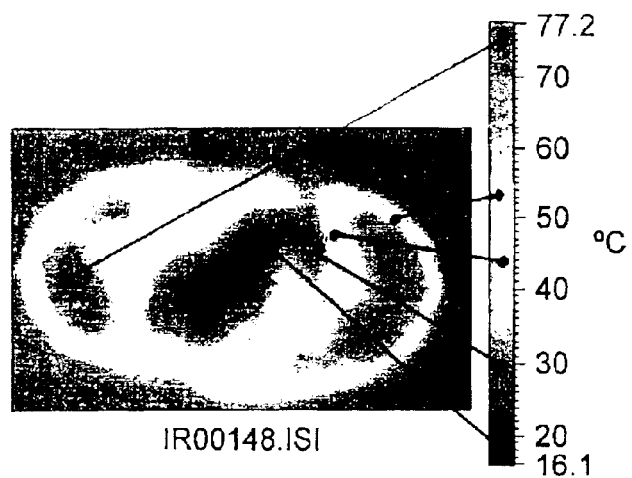

FIG. 14 shows the corresponding thermograph at the end of the heating stage.

Example 8

Theoretical Estimation of Modes in Heating of Frozen Meal in a Circular Shielded Plate According to the Invention Without being bound by theory, it is estimated that the invention is primarily based on a proper selection of the transverse modal fields that propagate within the food as determined by the rounded shape and the reduced dimension of the resonating layer associated to the support plate.

The resonating band and the cavity of the microwave oven make the meal in a rounded container a waveguide because standing waves occur inside the food. The modes inside the food can be estimated based on the theoretical analysis and the solutions of the electromagnetic fields of modes can be obtained by Maxwell's equations that are not given here for reasons of simplification but which can be found in "Foundation of Microwave Engineering" (R. E. Collin IEEE Press, 1991).

In the context of a circular resonating side layer, the following equation can be held:

$$(2af_{nm1})^2 \epsilon_r = (cx_{nm}/\pi)^2 + (c.1/2)^2(2a/d)^2,$$

where a is the radius of the resonating layer; d is the height of the layer;

n, m, 1 are related to the wavelength of the modes in three different directions respectively and are natural numbers starting counting from 0 to differentiate the modes; in particular, n and m are natural numbers related to the horizontal direction modes and 1 is a natural number related to the vertical direction modes;

c is the speed of light;

$f_{nm1}$ is the frequency of microwaves, $x_{nm}$ is $p'_{nm}$ for TE modes and $p_{nm}$ for TM modes; $p'_{nm}$ are zeros for first Bessel function.

Figure 18:
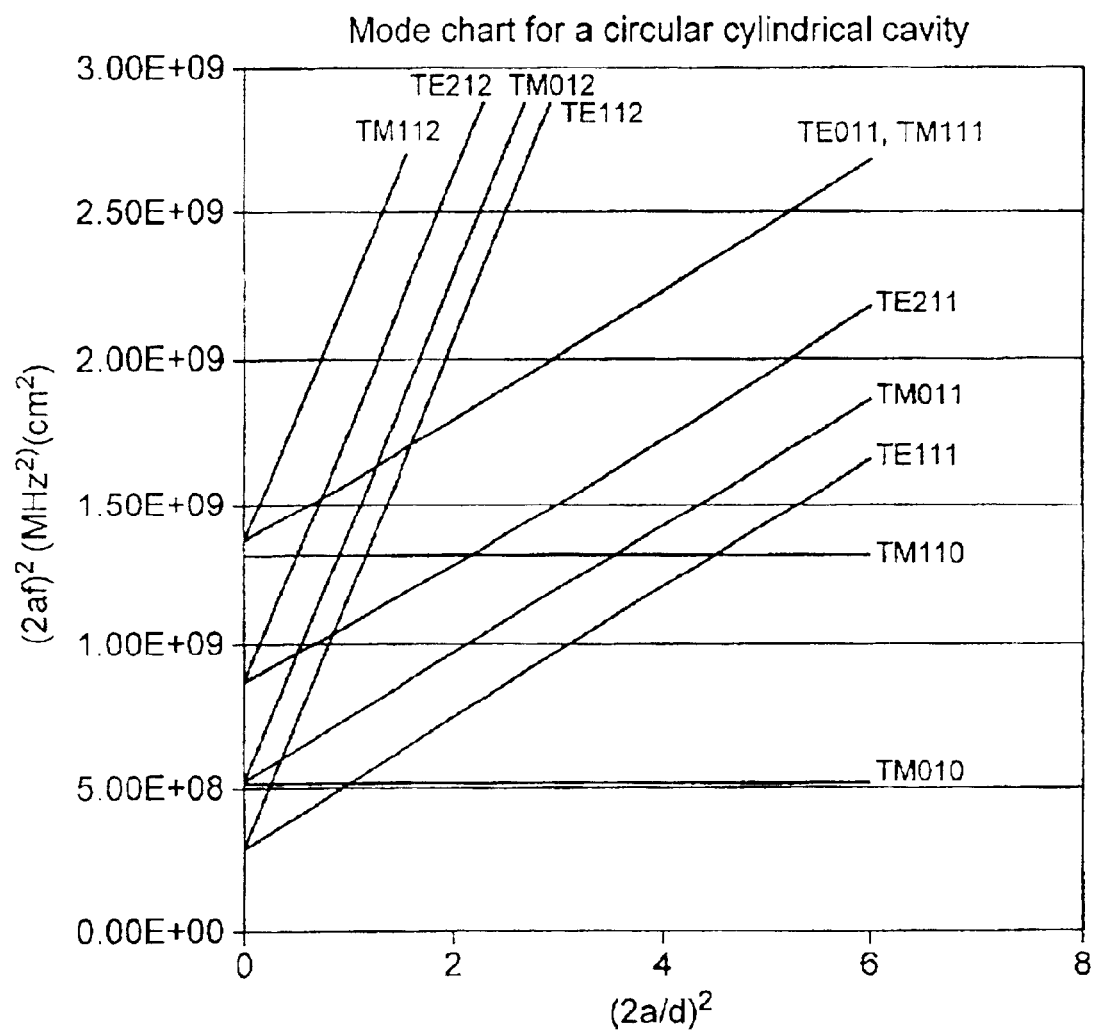
FIG. 18 is a resonant mode chart for a resonating band of circular contour.

For frozen meals, the dielectric constants are usually ranging from 3 to 5, therefore, the resonating mode inside can be calculated based on the graphed equation of FIG. 18 for various modes, as shown in the following table considering $f_{nm1}$ is 2450 MHz for usual microwave ovens and height d is 3.5 cm:

| Radius a (cm) | $(2af_{nm1})$ | 2a/d | $TE_{nm1}$ modes supported |
|---|---|---|---|
| 4 | $15.4 \cdot 10^8$ | 2.3 | $TE_{111}$, $TE_{010}$, $TM_{110}$ |
| 5 | $24.1^8$ | 2.8 | $TE_{111}$, $TM_{010}$, $TM_{110}$ |
| 6 | $34.5 \cdot 10^8$ | 3.4 | $TE_{111}$, $TE_{211}$, $TM_{010}$, $TM_{110}$, $TM_{011}$ |

Figure 15:
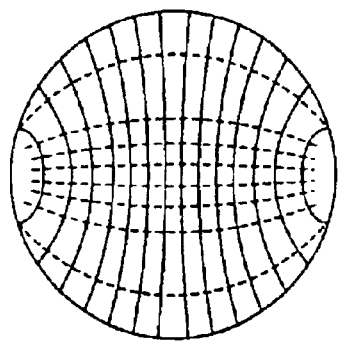
FIG. 15 is a computerized view of transverse modal field distribution for a circuit waveguide of circular contour in a TE11 mode.
Figure 16:
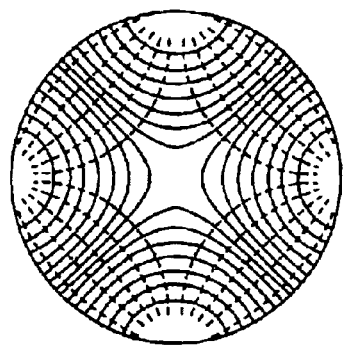
FIG. 16 is a computerized view of a transverse modal field distribution for a circuit waveguide of circular contour in a TE21 mode.

According to the solutions of these modes, TE modes usually carry more electrical energy than TM modes, therefore the focus is on TE modes. Electromagnetic fields at cross sections are plotted in FIGS. 15 and 16. When radius is small, the only $TE_{nm}$ mode that is supported is $TE_{11}$ that gives a fairly concentrated heating in the center area. When the radius increases, a new TE mode starts to become dominating, e.g., $TE_{21}$ mode (FIG. 16). For even larger containers, there will be supposedly more modes supported in the meal. Except $TE_{12}$ and $TE_{13}$ modes, most of them have a central cold spot. However, as the number of the "cold spot" TE modes usually increase, the influence of the non-"cold spot" TE modes usually decreases accordingly.

It can be noted that the first two numbers n and m for the $TE_{nm1}$ propagation modes really matter with respect to the heating distribution in the food because it corresponds to the largest transverse distribution in the horizontal direction. The third number 1 describes the distribution in the vertical (or z-axis) direction. Since it distributes along a short distance, i.e., the thickness of the meal, there is no much change in this direction except due to the dielectric loss factor.

Example 9

Figure 17:
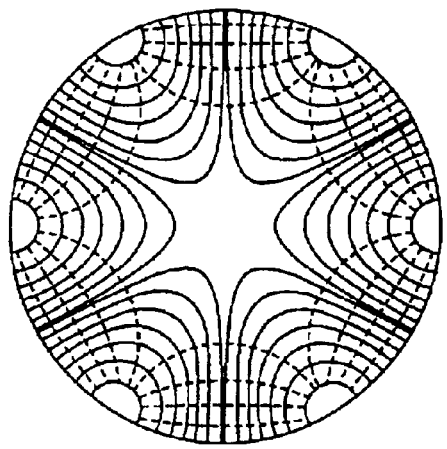
FIG. 17 is a computerized view of transverse modal field distribution for a circuit waveguide of circular contour in TE31 mode.

Theoretical Estimation of Modes in Heating of Frozen Meal in Container without Shielding Layer When the meal is in a normal container heated in a microwave oven, the meal can be seen as a dielectric resonator. At a frequency of f=2450 MHz, the resonating mode can be found through the following equations:

$$\tan(\beta d/2) = \alpha/\beta \text{ where } \alpha = \text{square root } [(p'_{nm}/a)^2 - k_0^2]$$

and $\beta$ = square root $[\epsilon_r \cdot k_0^2 - (p'_{nm}/a)^2]$ and, $k_0 = 2\pi f/c$ As an example, for a radius a of 5 cm and dielectric constant, $\epsilon_r$, of 4, the resonating mode is $TE_{31}$ which has a cold center as shown in FIG. 17. As it is shown, for containers without the resonating layer, the appearance of the modes with a cold center spot occurs at a smaller size.

For simplification purpose, the calculations in the examples have been made on a circular resonating configuration. However, it has been found by experiments that an elongated rounded resonating mode would perform at least as well as the circular mode and would be supposedly based on a similar theoretical analysis. Relevant literature references for more understanding of microwave theoretical analysis can be found in [1] R. E. Collin, Foundations of Microwave Engineering, IEEE Press, 1991, and [2] D. M. Pozar, Microwave Engineering, Addison-Wesley, 1993.

As used herein, the term "rounded" refers to a curved line configuration with no significant zone or portion of intersecting lines that would form angles equal to or less than 90 degrees. The term "oval" refers to any closed elongated convex curve having preferably two axis of symmetry. The term oval includes an elliptical curve but also a non-symmetrical or deformed curve or a curve having a few straight or concave portions but having a general elongated rounded shape. As an example, a bean-like shape is included. The "axial distance" refers to the longest distance that separates two points of the circumferential microwave reflective surface at about the level of the food upper surface when the food surface remains below the upper edge of the plate or container. Alternatively, the "axial distance" refers to the longest distance that separates two points at the upper edge of the circumferential microwave reflective surface when the food surface is such that it projects above the upper edge of the container. The line that links the said two points enables to define a primary axis. The food may project above the plate or container when the container is shallow and/or have relatively low inclined sides (for instance, a dinner plate).

Similarly, the "transverse" distance refers to the distance that separates two other points of the circumferential microwave reflective surface at about the level of the upper food surface, as taken along a secondary axis intersecting the primary axis at its centerline, when the food surface remains below the upper edge of the plate or container. The "transverse" distance refers to the distance that separates two other points at the upper edge of the circumferential microwave reflective surface, as taken along a secondary axis intersecting the primary axis at its centerline, particularly when the food surface is such that it projects above the upper edge of the container.

The axial and transverse dimensions may be equal in the context of a regular shape such as a circular shape or contour.

Where the term "substantially" is used, that term is generally defined to mean at least about 95% of the value referred to, to preferably at least about 100% of the value referred to.

What is claimed is:

1. A method for ensuring a more uniform heating of food by microwaves comprising:
   providing food in a portion having a predetermined size and shape;
   providing a container adapted for receiving and reheating the portion of food in a microwave oven; wherein the container includes a supporting cavity consisting of peripheral sides and a bottom side, with the peripheral sides of the container being circumferentially shielded by a microwave reflective material such that the microwave reflective material on the peripheral sides forms a circumference having axial and transverse distances that are determined so as to change the wavelength of resonant modes in the supporting cavity; wherein the microwave reflective material is configured as a band and is positioned to allow microwaves to enter the cavity and to avoid non-heated areas in the cavity by arranging the food lower surface contacting the bottom side to be placed at the lower line of the band of reflective material or at a level above it by up to 10 mm;

placing the portion of food in the supporting cavity; and heating the food and container with microwaves so as to expose the food to the changed wavelengths of resonant modes in the cavity thereby resulting in a more uniform heating food pattern and a more uniform heating of the food.

2. The method of claim 1, wherein the band of microwave reflective material forms a resonating layer having a transverse distance at the surface of the food of about 15 cm or less.

3. The method of claim 2, wherein the resonating layer has a closed rounded contour.

4. The method of claim 3, wherein the band of microwave reflective material forms a resonating layer having an oval contour with an axial distance of about 20 cm or less.

5. The method of claim 1, wherein the band of microwave reflective material forms a resonating layer having a height of about 10 to 60 mm.

6. The method of claim 5, wherein the band of microwave reflective material forms a resonating layer having a height of 25 to 45 mm.

7. The method of claim 1, wherein the TE modes predominantly supported in the cavity are $TE_{n,m,1}$ where n,m,1 are such that $0 \leq n \leq 2$, $0 \leq m \leq 1$ and $0 \leq 1 \leq 1$.

8. The method of claim 1, wherein the bottom side of the container is substantially free of shielding material.

9. The method of claim 1, wherein the band of microwave reflective material has a thickness of at least 3.2 microns and is coated or attached to the sidewalls of the container.

10. The method of claim 1, wherein the container is made of ceramic, glass, plastic, cardboard or combination thereof.

11. The container assembly of claim 10, wherein the resonating layer is arranged so that the TE modes predominantly supported in the cavity are $TE_{n,m,1}$ modes where n, m, 1 are such that $0 \leq n \leq 2$, $0 \leq m \leq 1$ and $0 \leq 1 \leq 1$.

12. A method for ensuring a more uniform heating of food by microwaves comprising:

providing food in a portion having a predetermined size and shape;

providing a container adapted for receiving and reheating the portion of food in a microwave oven; wherein the container includes a supporting cavity having peripheral sides and a bottom side, with the peripheral sides of the container being circumferentially shielded by a microwave reflective material such that the microwave reflective material on the peripheral sides forms a circumference having axial and transverse distances that are determined so as to change the wavelength of resonant modes in the supporting cavity;

placing the portion of food in the supporting cavity; and heating the food and container with microwaves so as to expose the food to the changed wavelengths of resonant modes in the cavity thereby resulting in a more uniform heating food pattern and a more uniform heating of the food, wherein the reflective material forms at least a part of a supporting stand that substantially nests the container in a removable manner.

13. The method of claim 12, wherein the stand has a body portion with a wedge-shaped receiving microwave reflective surface to snuggly engage the complementary surface of the container and leverage means pivotally associated to the body portion to act on the bottom surface of the container to disengage the container from the wedge-shaped receiving surface.

14. A method for ensuring a more uniform heating of food by microwaves comprising:

providing food in a portion having a predetermined size and shape;

providing a container adapted for receiving and reheating the portion of food in a microwave oven; wherein the container includes a supporting cavity having peripheral sides and a bottom side, with the peripheral sides of the container being circumferentially shielded by a microwave reflective material such that the microwave reflective material on the peripheral sides forms a circumference having axial and transverse distances that are determined so as to change the wavelength of resonant modes in the supporting cavity;

placing the portion of food in the supporting cavity;

heating the food and container with microwaves so as to expose the food to the changed wavelengths of resonant modes in the cavity thereby resulting in a more uniform heating food pattern and a more uniform heating of the food, and removing the food portion in a frozen state from a package of a defined shape and size prior to placing the food portion in the container, wherein the shape and size of the packaged food portion are predetermined to substantially match the shape and size of the cavity of the container.

15. The method of claim 14, wherein the package is disposable and removed for microwave heating of the food and wherein the food is placed in the cavity of the container in a manner to snuggly fit into the cavity of the container.

16. The method of claim 14, wherein the portion of food is filled in a thermoformed package cell that precisely determines the size and shape of the food portion.

17. A food container assembly adapted for receiving and reheating of a food portion with microwaves; comprising a food portion and a container forming a cavity consisting of peripheral sides and a bottom side for the portioned food to be placed within the cavity, with the peripheral sides of the container being shielded by a microwave reflective material and the microwave reflective material of the peripheral sides defining a circumference having axial and transverse distances that are determined so as to promote propagation of certain resonant modes inside the cavity and in a food portion that is placed into the cavity, wherein the microwave reflective material is configured as a band and is positioned to allow microwaves to enter the cavity and to avoid non-heated areas in the cavity by arranging the food lower surface contacting the bottom side to be placed at the lower line of the band of reflective material or at a level above it by up to 10 mm; thus resulting in a more uniform heating food pattern and a more uniform heating of the food portion.

18. The container assembly of claim 17, wherein the band of microwave material forms a resonating layer having a transverse distance of about 15 cm or less, an axial distance of about 20 cm or less, and a height of about 10 to 60 mm.

19. The container assembly of claim 18, wherein the resonating layer has a circular or oval contour.

20. The container assembly of claim 17, wherein the bottom side is substantially free of reflective material.

* * * * *

UNITED STATES PATENT AND TRADEMARK OFFICE
CERTIFICATE OF CORRECTION

PATENT NO. : 6,777,655 B2  
DATED : August 17, 2004  
INVENTOR(S) : Zhang et al.

It is certified that error appears in the above-identified patent and that said Letters Patent is hereby corrected as shown below:

Column 13,  
Line 5, after "microwave reflective material is configured", delete "as a band".  
Line 6, before "positioned to allow microwaves to enter the", delete "is".  
Line 9, after "side to be placed at the lower line of the", delete "band of".  
Lines 16, 25 and 36, after "The method of claim 1, wherein the", delete "band of".  
Line 22, after "The method of claim 3, wherein the", delete "band of".  
Line 28, after "The method of claim 5, wherein the", delete "band of".

Column 14,  
Line 52, after "reflective material is configured", delete "as a band"; and before "positioned", delete "is".  
Line 56, after "line of the", delete "band of".  
Line 59, after "The container assembly of claim 17, wherein the", delete "band".  
Line 60, before "microwave materials forms a resonating layer having a", delete "of".

Signed and Sealed this

Twenty-fourth Day of May, 2005

JON W. DUDAS  
*Director of the United States Patent and Trademark Office*